July 9, 1929.  J. W. SMITH  1,720,246
FUEL MIXING DEVICE
Filed June 21, 1927   2 Sheets-Sheet 2
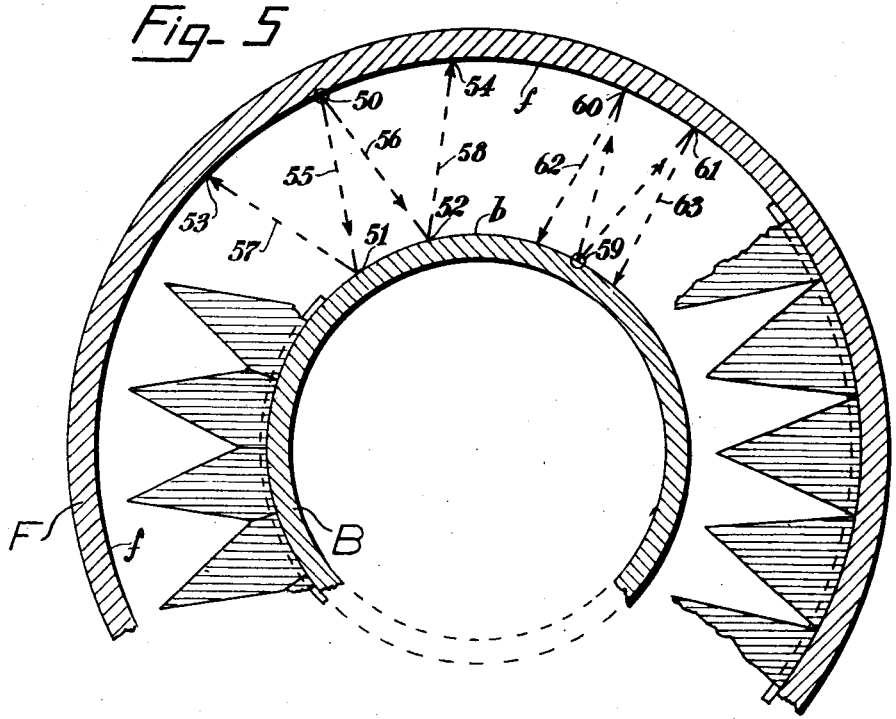
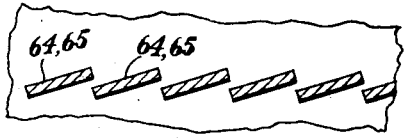
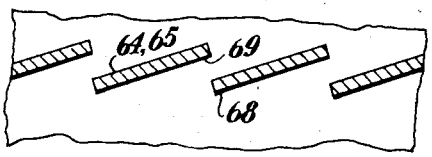
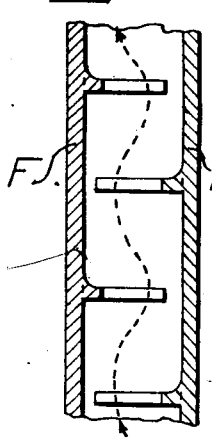
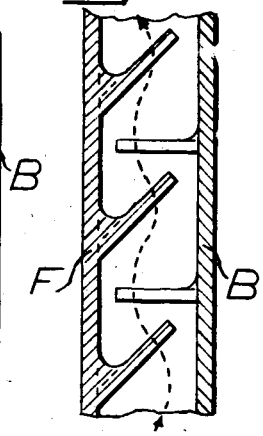
John William Smith INVENTOR
WITNESS Francis H. Richards,   BY Gustav Drews ATTORNEY Patented July 9, 1929.

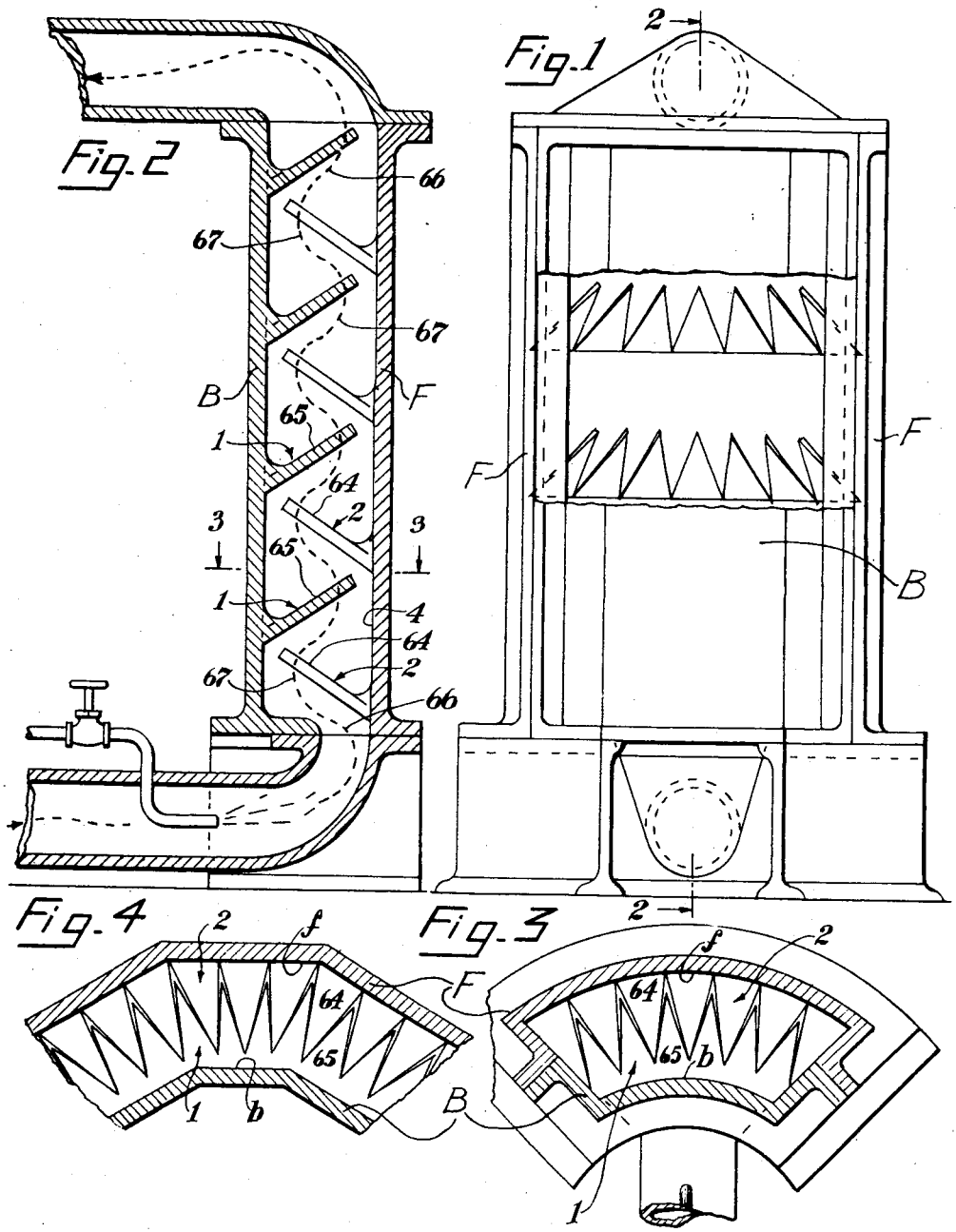

1,720,246

UNITED STATES PATENT OFFICE.

JOHN WILLIAM SMITH, OF SYRACUSE, NEW YORK.

FUEL-MIXING DEVICE.

Application filed June 21, 1927. Serial No. 200,309.

The present application constitutes in part a division of my co-pending application, Serial No. 105,610 filed April 29, 1926.

The present improvements while adapted for being used in the admixturing of various gases with each other and various liquids with each other, and also one or more gases with one or more liquids, are herein illustrated as being specially arranged and adapted for use in charging air with liquid fuel, usually in spray form, and bringing the said fuel to a highly comminuted condition and also intimately interassociating the said comminuted fuel with and uniformly throughout the air.

A leading object of the present improvements is to provide fuel-charged-air of the highly conditioned character described, for economically operating furnaces as, for instance, the manufacture or working of steel or other metals and for operating oil or gas engines most advantageously. A further object is to provide an efficient system and an arrangement of apparatus for mixing or blending two or more gases or two or more liquids as required for practically attaining maximum efficiencies and economies when employed in various industries.

In this connection it will be remembered that serious losses of fuel are incurred through the common practice of using air in excessive quantities and thereby reducing the intensity and completeness of combustion; besides occupying valuable space and carrying off much heat and thus resulting in an unnecessary waste of fuel.

For accomplishing the said results, the apparatus hereinafter described is shown as being organized and equipped for subjecting a stream of the charged air while forwardly-flowing in a conduit, to a progressive conditioning treatment involving a complex of actions and forces whereby the stream is repeatedly diverted, reformed and, reversely shifted and intermixed during its flowage, while any of the uncomminuted or heavier bodies, as globules or vesicules, are subjected to a repeated and forcible impactive, disintegrative and dispersive treatment whereby effectively to interassociate all of the materials comprised in the forwardly flowing stream.

These and other features, capabilities and advantages of the invention, will appear from the subjoined detail description of specific embodiments thereof, illustrated in the accompanying drawings in which Figure 1 is a side elevation of one embodiment of the present improvements;

Fig. 2 is a section on the line 2—2 of Fig. 1;

Fig. 3 is a section on the line 3—3 of Fig. 2;

Fig. 4 is a section similar to Fig. 3 of a modification;

Fig. 5 is a section similar to Fig. 3 of still another embodiment of the present improvements;

Figs. 6 and 7 are fragmental sections showing different arrangements of the blades forming a part of the present improvements;

Figs. 8 and 9 are fragmental sections of conduits showing different arrangements of the opposing blades forming an important part of the present improvements.

For convenience of illustration and description, the conduit column has been illustrated in the drawings as being located in a vertical position; in practice, however, the conduit may be arranged for being used not only in a vertical position, but may also be adapted and readily connected for being used in a horizontal or inclined position, whenever such a change may be found necessary or more desirable. In any such instance, the conduit column may be provided with, or be used in connection with some suitable supporting means or devices, such as are well known and commonly employed for many analogous purposes in various industrial or other establishments. In this connection it is to be noted that such conduit columns may be made of such sizes, both as to length and cross-sectional dimensions, as shall be suitable for the service and capacity found to be needful in any particular instance. Therefore, in practice, the conduit column and the details and accessories thereof and therefor may be of small dimensions when the apparatus is constructed for work requiring the treatment of only small volumes, and may be of large dimensions when employed for treating large volumes of the materials, as for instance, when proportioned for admixturing large volumes of gases, or for blending large quantities of liquids.

In Fig. 2, the merging-chambers are shown of the simple form produced by the positioning of the several partition plates, as 1, 2, on equal angles, and in alternately reverse positions, respectively, relatively to the walls, B, F, of the conduit column. For instance, the partition plate 1 is shown extending from the left-hand wall B and forwardly at an angle of about thirty degrees from the horizontal, while the next following plate, 2, extends from, and has the same angle relative to the right-hand wall F, thereby forming, with the wall-surface at 4, three chamber-enclosing members. Thus the several said chambers are here shown, as to the end-view form thereof, as having the interior or cross-sectional space thereof, in the form, substantially, of an equilateral triangle. This construction, while regarded as sufficient and desirable for a variety of purposes or uses, may be modified in form and proportions in accordance with the requirements as these may arise in practice. And, in my said prior application, Ser. No. 105,610, a series of such modifications and further improvements are illustrated and explained, and are adapted for use in the apparatus herein illustrated. In Figs. 8 and 9 hereof two of those modifications are illustrated; these views correspond to Figs. 11 and 12 respectively, (on Sheet 3) of said application Ser. No. 105,610, and will be understood without a more particular description thereof being repeated herein.

Referring to the curved form of the channel walls, B and F, as employed in the apparatus herein described, it will be understood that the degree of curvature may be varied in accordance with the conditions and requirements in any particular instance. In Fig. 3 said walls are shown as having the cross-sectional form of circular arcs, and as employed in the columnar structure illustrated in Figs. 1 and 2. Also, in Fig. 3 the radius of the transversely convex inner wall B is shown as being about two-thirds as long as the radius of the transversely concave outer wall, F, but these proportions may be varied, as already indicated. For instance, in Fig. 5 the said ratio of those radii only varies slightly from one to two; and this view also clearly indicates how the said curved channel-walls may be extended laterally thereof into an annular form. This annular construction, however, together with certain details and additional features, (which are not herein described nor fully shown), constitutes subject-matter in, and is more fully illustrated and described in a separate application.

In said Fig. 5, there is illustrated one of the important results secured, in practice, by the construction of the stream-channel, (or conduit-channel), with the said walls thereof in the described transversely-curved form, and also symmetrically positioned, these walls, preferably, having a longitudinal parallelism. Thus said walls, or the inner surfaces, as $f$ and $b$ thereof, are oppositely disposed, the outer wall, F, having the said concave inner surface $f$, and the inner wall, B, having the convex outer surface $b$. The stream while flowing through said channel, has the materials and the body thereof alternately treated in a dispersive and interblending manner and is forced first toward one said wall and then toward the other said wall, thereby creating certain flowage-lines, with resultant or force-lines having, or tending to develop a peculiar spreading and lateral action of a dynamic nature.

For instance, a flowage-line, or force, leading from a point, 50, on the concave surface $f$, and directed and spreading to or toward the points 51, 52, on said convex surface B, will naturally react (on equal but reverse angles) toward the widely separated points 53, 54, respectively, on said concave surface $f$. Thus, any such dynamic action, or flowage lines as 55, 56, react on more widely spreading lines, as 57, 58, toward a greater arc or zone on the said concave surface; also, although not here shown, it will be evident that said reactionary effect may be shifted, or directed, to a more advanced position, or height, longitudinally of the channel, by reason of the stream flowing therein.

When said conduit surfaces $f$ and $b$, are extended to an annular form, the above described operation of said flowage-reaction and force-lines, which may occur simultaneously at several points in the circuits, operate throughout the entire circumference, and thereby tend to aid in a progressive manner to the diffusion and intermixing of the stream-elements during the flowage of these elements lengthwise of the conduit with the described stream-shifting effects.

Also, in Fig. 5, force-lines are shown extending from point 59 on the convex wall to points 60, 61, respectively, on said concave wall $f$, and there reacting by lines 62, 63, to the short arc on the convex-wall face $b$. Thus the reaction flowage forces leading from the convex wall tend to return thereto with only a slight, if any, spreading effect.

In Fig. 4 there is shown another modification similar to Fig. 3 in which the opposing walls F and B consist of sections of similar polygons forming arches, the similar sides of which are parallel, and preferably as shown, all of the sides of the wall B are shorter than the sides of the wall F and spaced an equal distance from the opposing sides of the wall F. In this modification, as is the case with the modification of Fig. 3, the wall B is shorter than the wall F, and consequently although in a less uniform manner, here too, the particles moving from the convex surface $b$ when deflected toward the concave surface $f$ will be caused to spread apart, and in turn when again returned toward the surface $b$ will be caused to occupy a smaller area resulting in a constantly alternating expansion and contraction of the stream, operating to further diffuse and intermix the air and fuel components of the stream.

In the construction of these conduits, it is desirable to use the incisor type of interceptors, illustrated and described in my co-pending application aforesaid, Serial No. 105,610. In Figs. 3 and 4, the interceptors 2 are shown as composed of a series of blades 64 having their bases register with the concave wall f and their edges converge to points extending beyond the middle of the stream channel. The interceptors 1 in these modifications are shown as composed of a series of blades 65 having their bases spaced from the convexed wall b and their edges similarly converging to points and extending beyond the middle of the stream channel. The successive series of blades 64 and 65, as more clearly shown in Figs. 3 and 4, preferably are so disposed relative to one another that the blades 64 aline with the spaces between the blades 65 and that the blades 65 in turn aline with the spaces between the blades 64. In this way, see Fig. 2, each of the blades 65 of the lowermost interceptor 1 will extend into the paths of movement of the stream portions passing between the adjacent blades 64 of the lowermost interceptor 2, and in turn each of the blades 64 of the second lowermost interceptor 2 will extend into the paths of movement of the stream portions passing between the adjacent blades 65 of the lowermost interceptor 1, and so on.

The line 66, see Fig. 2, indicates diagrammatically the rise and fall of the pressure in the stream portions during their upward movement, the bulges 67 below the interceptors 1, 2, indicating the increase in pressure in the stream portions as distinguished from the decrease in pressure beyond the interceptors 1, 2. From the foregoing, it will thus be seen that in the present device the interceptors not only serve constantly to divide and subdivide the stream into a plurality of stream portions, but due to the arcuate or arched cross-section of the stream channel, see Figs. 3 and 4, cause a pulsating rise and fall in pressure of the stream portions as they are directed from one wall b to the other wall f and back again, and similarly cause a different rise and fall in pressure in the stream portions as they approach an interceptor 2 and again leave the same, this constant intercrossing change in pressure, functioning intimately to diffuse and intermix the air and fuel components of the stream.

In Figs. 6 and 7, further modifications are illustrated in which the blades 64 of each interceptor, for instance, are staggered relative to one another so that the stream in passing upward through the conduit illustrated in Fig. 2 will not only be deflected from the wall B to the wall F and back again, but also from one end to the other end of the conduit. In this case, the opposing blades 65 when in operative relation to the blades 64 will be inclined in the opposite direction, thereby to cause the stream portions as they are received by the blades 65 to be shifted in the opposite direction to that caused by the inclination of the blades 64 and thus again a further rise and fall in pressure will be created in the stream portions passing from one interceptor 1 to the succeeding interceptor 2, and so on.

The blades 64, 65, may, of course, be constructed in different widths and formed at different inclinations relative to one another without departing from the general spirit of the invention. In Fig. 7, the blades 64, 65, are illustrated as substantially twice the width of the blades illustrated in Fig. 6. In the modifications of Figs. 6 and 7, it will further be seen that the lower edges 68 may be caused to overlap the upper edges 69 of adjacent blades, thereby further to intercept the stream portions in their passage through the conduit.

The points of the blades 64 adjacent the wall B are grouped together closer than the points of the blades 65 thereby to increase the resistance to the stream portions when flowing adjacent to the wall B and consequently further to increase the pressure in the stream portions when flowing adjacent to the wall B as compared to the pressure in the stream portions when flowing adjacent to the wall F.

It is obvious that various changes and modifications may be made to the details of construction without departing from the general spirit of the invention as set forth in the appended claims.

I claim:

1. In a device of the character described, the combination with a conduit forming a passage and having a long side wall, of an opposing short side wall, a plurality of interceptors extending from the long side wall across the middle of the conduit forming passage toward the short side wall, and another plurality of interceptors extending from the short side wall across the middle of the conduit forming passage toward the long side wall and into the chambers formed between the interceptors extending from the long side wall, said interceptors being each composed of a series of blades having edges converging to points, the points of the interceptor blades extending from the long side wall being grouped closer to one another adjacent the short side wall than the points of the interceptor blades extending from the short side wall thereby to increase the resistance to the stream portions when adjacent said short side wall and thus further to increase the pressure in said stream when adjacent said short side wall.

2. In a device of the character described, the combination with a conduit forming a passage and having opposing side walls, a plurality of interceptors extending from one side wall across the middle of the conduit forming passage toward the other, and another plurality of interceptors extending from the other side wall across the middle of the conduit forming passage and into the chambers formed between the interceptors extending from said first side wall, said interceptors being each composed of a series of blades having edges converging to points, the points of one set of interceptor blades being grouped closer to one another than the points of the other set of interceptor blades thereby to increase the pressure in the stream portions flowing adjacent one side wall as compared to the pressure in the stream portions flowing adjacent the opposite side wall.

3. In a device of the character described, the combination with a conduit forming a passage and having a long side wall composed of a plurality of sections inclined to one another to form an arch, of an opposing short side wall composed of a plurality of sections inclined to one another to form an opposing arch, a plurality of sets of interceptor blades extending from the long side wall across the middle of the conduit forming passage toward the short side wall and forming a plurality of transversely extending mixing chambers, and another plurality of sets of interceptor blades extending from the short side wall across the middle of the conduit forming passage toward the long side wall and into the mixing chambers formed between the sets of interceptor blades extending from the long side wall.

4. In a device of the character described, the combination with a conduit forming a passage and having a long side wall composed of a plurality of sections inclined to one another to form an arch, of an opposing short side wall composed of a plurality of sections inclined to one another to form an opposing arch, a plurality of sets of interceptor blades extending from the long side wall across the middle of the conduit forming passage toward the short side wall and forming a plurality of transversely extending mixing chambers, and another plurality of sets of interceptor blades extending from the short side wall across the middle of the conduit forming passage toward the long side wall and into the mixing chambers formed between the sets of interceptor blades extending from the long side wall, the several blades of each set being inclined longitudinally relative to the side walls and in the direction of travel of the stream to be treated.

5. In a device of the character described, the combination with a conduit forming a passage and having a long side wall composed of a plurality of sections inclined to one another to form an arch, of an opposing short side wall composed of a plurality of sections inclined to one another to form an opposing arch, a plurality of sets of interceptor blades extending from the long side wall across the middle of the conduit forming passage toward the short side wall and forming a plurality of transversely extending mixing chambers, and another plurality of sets of interceptor blades extending from the short side wall across the middle of the conduit forming passage toward the long side wall and into the mixing chambers formed between the sets of interceptor blades extending from the long side wall, the several blades of each set being inclined longitudinally relative to the side walls and in the direction of travel of the stream to be treated, the several blades of each set being also inclined transversely relative to the transverse section of the conduit to cause the stream portions to be shifted from end to end of the conduit.

6. In a device of the character described, the combination with a conduit forming a passage and having a long side wall composed of a plurality of sections inclined to one another to form an arch, of an opening short side wall composed of a plurality of sections inclined to one another to form an opposing arch, a plurality of sets of interceptor blades extending from the long side wall toward the short side wall and forming a plurality of transversely extending mixing chambers, and another plurality of sets of interceptor blades extending from the short side wall across the middle of the conduit forming passage toward the long side wall and into the mixing chambers formed between the sets of interceptor blades extending from the long side wall, the several blades of the sets extending from the long side wall being inclined transversely in one direction and the several blades of the sets extending from the short side wall being inclined transversely in the opposite direction so that the stream portions will be given an endwise movement alternately in opposite directions thereby to cause a rise and fall in the pressure of the stream portions as the stream passes through said conduit.

JOHN WILLIAM SMITH.